Figure 1:
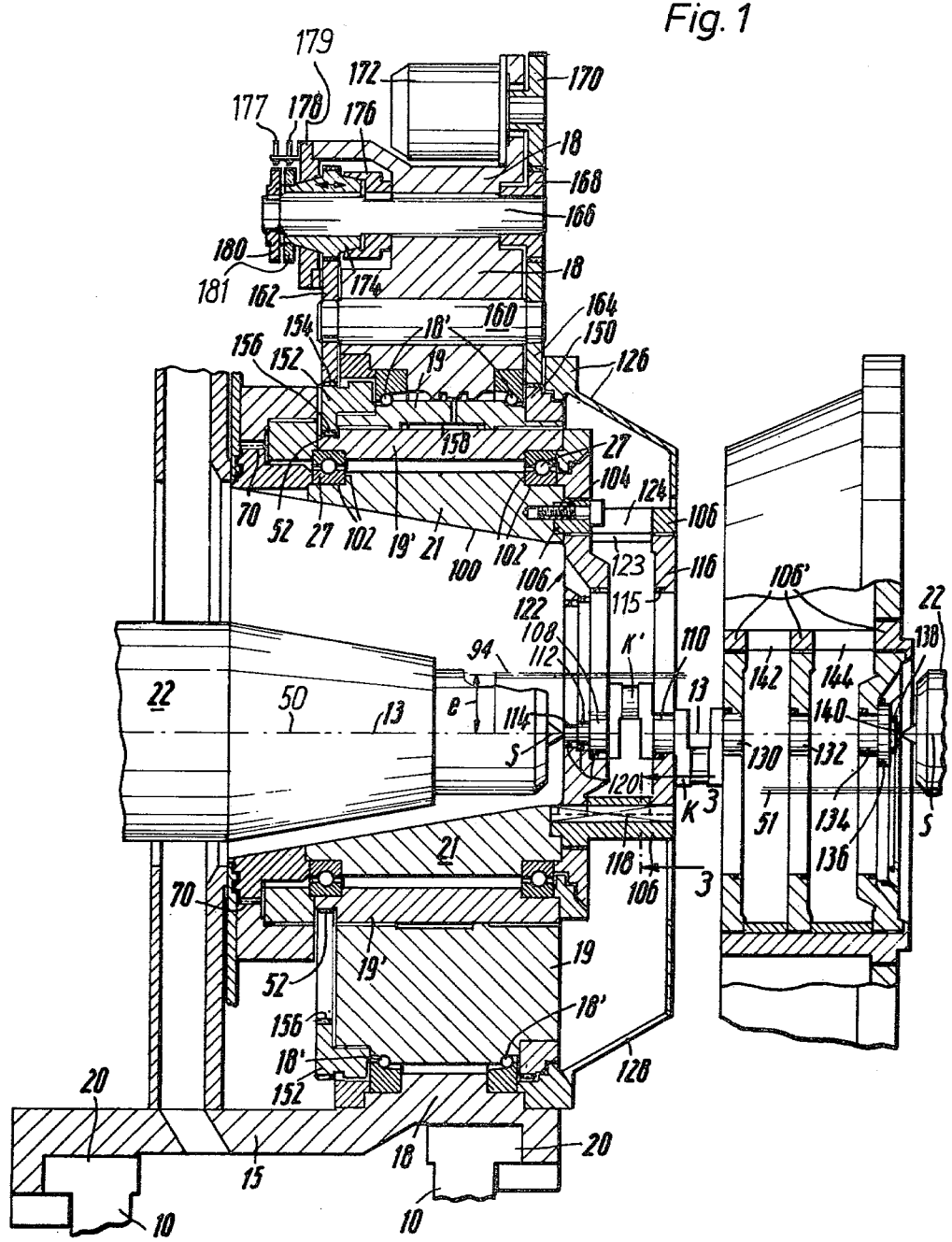

United States Patent [19]

Berbalk

[11] 4,276,794
[45] Jul. 7, 1981

[54] TOOL MACHINE FOR MACHINING CRANKSHAFTS AND A METHOD OF OPERATION THEREOF

[75] Inventor: Hermann Berbalk, Göppingen, Fed. Rep. of Germany

[73] Assignee: Gebrüder Boehringer G.m.b.H., Fed. Rep. of Germany

[21] Appl. No.: 94,948

[22] Filed: Nov. 16, 1979

Related U.S. Application Data

[60] Continuation-in-part of Ser. No. 876,867, Feb. 10, 1978, abandoned, which is a division of Ser. No. 741,519, Nov. 12, 1976, Pat. No. 4,090,422.

[30] Foreign Application Priority Data

Nov. 4, 1975 [DE] Fed. Rep. of Germany ....... 2551250

[51] Int. Cl.$^3$ ........................... B23B 1/00; B23B 5/18
[52] U.S. Cl. ......................................... 82/1 C; 82/9; 82/20
[58] Field of Search .......................... 82/1 C, 9, 25, 20

[56] References Cited

U.S. PATENT DOCUMENTS 3,513,731  5/1970  Michelson ............................... 82/20
3,795,161  3/1974  Berbalk ................................... 82/20

*Primary Examiner*—Leonidas Vlachos
*Attorney, Agent, or Firm*—Shlesinger, Fitzsimmons & Shlesinger

[57] ABSTRACT

The present invention relates to a tool machine of a known type in which a crankshaft is machined by a rotary annular tool having internal cutting edges located on at least one circle through which the crankshaft extends. The crankshaft is held by means mounted on the bed of the machine in stationary condition. A slide on this bed movable in a direction parallel to the crankshaft carries a tool unit which is movable on the slide to a cutting position in which said circle is located in a tangential relationship to the pin of the crankshaft being cut and to a loading and unloading position in which said circle is brought to co-axial relationship with the main axis of the crankshaft. When the tool unit is in this position, it may be moved by the slide to such a position close to one of the columns on the bed that the tool surrounds a substantially cylindrical projection on the column carrying the end of the crankshaft. In this position the tool unit is located beyond the end of the crankshaft permitting the same to be easily released from the clamping and centering means and unloaded from the machine which may then be charged with the next crankshaft. A second slide on the bed carries a second tool unit with the same equipment which in the loading and unloading position is located beyond the other end of the crankshaft. Each rotary annular tool may have internal cutting edges located on a plurality of co-axial spaced circles through which the crankshaft extends. Therefore, the tool of each tool unit is capable of simultaneously machining two or more co-axial sections of the crankshaft, such as the line bearing sections. Each tool comprises axially spaced annular cutting elements having internal cutting edges and mounted within an annular supporting body provided with apertures for the discharge of chips. Preferably the tool in one tool unit rotates in a direction opposite to the tool of the other tool unit and these tools engage the crankshaft in different radial planes of the crankshaft which may be offset from each other by a large angle up to 180°. The tool is rotatably mounted within an eccentric body which in its turn is mounted within the tool unit for rotation whereby the cutting tool may be caused to orbit around the work. The eccentric body may be composed of relatively adjustable elements affording a variation of the distance of the tool axis from the axis of the eccentric body. This variation affords a possibility of roughing and finishing the work.

6 Claims, 4 Drawing Figures

TOOL MACHINE FOR MACHINING CRANKSHAFTS AND A METHOD OF OPERATION THEREOF

BACKGROUND AND OBJECTS

The present application is a continuation-in-part of my copending application Ser. No. 876,867, which was filed Feb. 10, 1978 (now abandoned), and which in turn was a division of my application Ser. No. 741,519 filed Nov. 12, 1976, now U.S. Pat. No. 4,090,422.

This invention represents a further development and improvement of a prior machine tool for machining a crankshaft as disclosed in the U.S. Pat. No. 3,795,161 granted on Mar. 5, 1974 jointly to the inventor of the instant case and to another inventor. The disclosure of such prior patent is to be considered part of the disclosure of the present invention. The present invention and the prior invention both relate to a machine tool for machining a plurality of co-axial cylindrical shaft surfaces, such as the journal surfaces of a crankshaft. For this purpose an annular milling or grinding tool is used which is provided with internal cutting edges and orbits during a machining operation about the axis of the shaft which constitutes the workpiece.

The prior machine has two longitudinal slides which are displaceable on a longitudinal guideway on a bed of the machine tool, the guideway extending parallel to the axis of the workpiece to be machined. Each slide carries a tool unit comprising a cross-slide carrying the annular tool and driving means which rotate the tool about its own axis and at the same time cause the tool to orbit about the axis of the workpiece. In the case of the prior machine tool, each annular tool employed therein has only one circular set of internal cutting edges and can therefore machine only one cylindrical shaft surface at a time, a second surface being machined simultaneously by the tool unit mounted on the other longitudinal slide. Hence, it is not possible to machine more than two spaced line bearing shaft surfaces simultaneously with the prior annular tool on the prior machine tool. There is not room enough in that machine tool for placing the tool units so close enough to each other as would be generally required for the simultaneous machining of more than two co-axial line bearing shaft surfaces.

It is an object of the invention to provide a machine tool with a pair of tool units each having an annular milling tool with internal cutting edges capable of simultaneously machining at least two co-axially spaced cylindrical shaft surfaces, in particular the surfaces of the journals of the line bearings of a crankshaft and to minimize the tendency of the cutting forces to deform and dislocate the workpiece.

In accordance with the present invention an annular milling tool for simultaneously machining a plurality of co-axially spaced shaft surfaces by the orbiting method has at least two circular sets of internal cutting edges with gaps for chip removal between said sets.

It is possible to employ annular tools having at least two sets of internal cutting edges on the prior machine tool as described in U.S. Pat. No. 3,795,161. In this case all of the co-axially spaced cylindrical shaft surfaces of the journals on one half of a crankshaft can be simultaneously machined by the annular tool carried by the tool unit provided on one of the two longitudinal slides of the aforesaid machine tool and all the co-axially spaced cylindrical shaft surfaces of the journals on the other half of that crankshaft can be simultaneously machined by the novel annular milling tool carried by the tool unit provided on the other one of the two longitudinal slides.

As a result the crankshaft being machined is subject to very high cutting forces tending to deform and to dislocate the workpiece. I have found that this highly undesirable effect can be minimized by so operating the machine (a) that the annular tool of one tool unit rotates in a direction opposite to that of the tool of the other tool unit, and/or (b) that both tools engage the crankshaft cuttingly in different radial planes of the co-axial crankshaft bearings which planes are angularly offset from each other by a large angle of up to 180°.

The bending moments exerted on the work by one of the two annular tools will then act on the workpiece in a direction opposite to that of the bending moment exerted by the other annular tool so that the bending and torsional stresses exerted on the workpiece during the milling operation are reduced.

Figure 2:
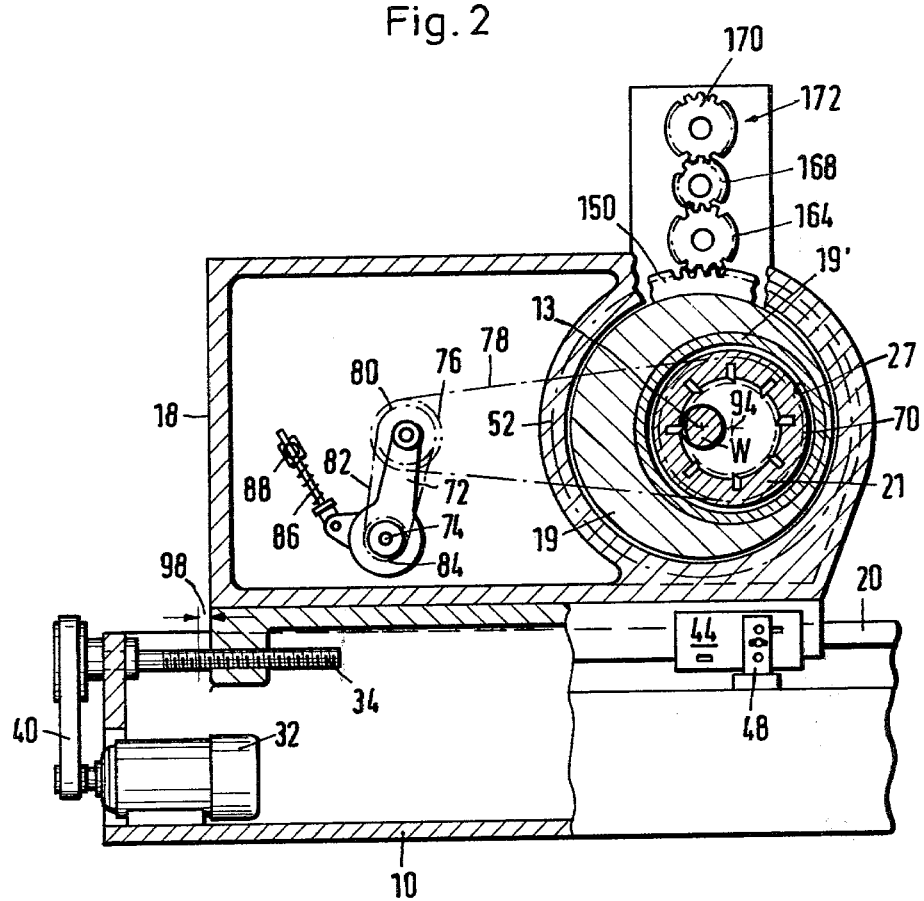
Figure 3:
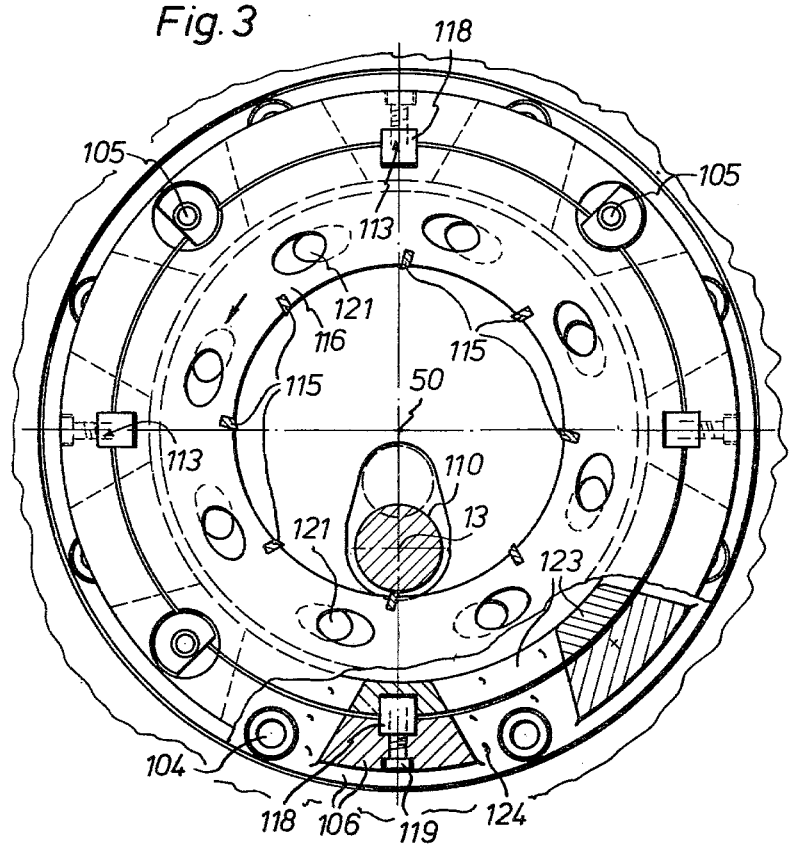
Figure 4:
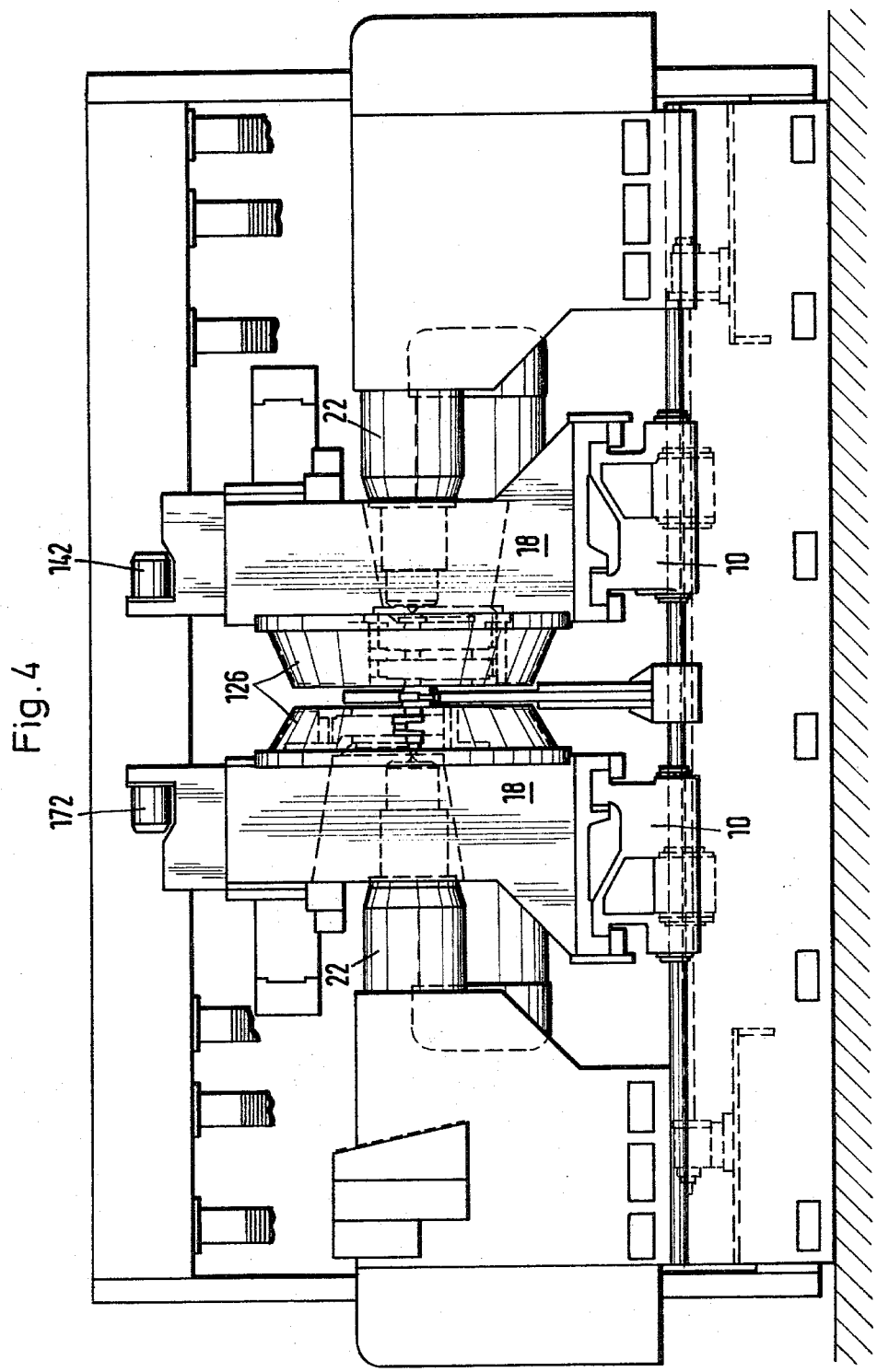

Preferred embodiments of the invention will now be described with reference to the accompanying drawings in which FIG. 1 is a partial vertical longitudinal section through a machine tool equipped with a pair of tool units designed in accordance with the invention, the right hand unit being shown in part only, the plane of section containing the axis of the workpiece and of the annular milling tools of the two tool units;

FIG. 2 is a diagrammatic vertical section taken through the tool unit along a vertical plane extending at right angles to the work axis in which the means for variably adjusting the eccentricity of the eccentric body are omitted and in which the annular milling tool is shown as being located inside of the eccentric body rather than laterally thereof, FIG. 2 being similar to FIG. 4 of the prior U.S. Pat. No. 3,795,161;

FIG. 3 is a side view of the annular milling tool of the left hand tool unit shown in FIG. 1, partly in section along the line 3—3 of FIG. 1; and FIG. 4 is a front view of the machine.

The machine illustrated in the drawings embodies the invention forming the subject matter of the prior U.S. Pat. No. 3,795,161 referred to hereinabove. The disclosure of this prior patent is therefore to be considered as forming part of the description following hereinafter. The reference numerals used in the prior patent are also used hereinafter for the corresponding elements. As described in the prior patent, two longitudinal slides 10 are guided and displaceable on a horizontal guideway along a bed or frame. Only parts of the left-hand slide 10 are shown and the right-hand slide is not shown at all, neither is the bed or frame illustrated. At each of its ends, the bed is formed with an upright (not shown) out of which projects horizontally a substantially cylindrical neck 22, terminating in a centre pin S. A crankshaft K to be machined is mounted between the centres S of both necks 22. In the drawing, only two crankpins of the shaft K are shown, together with their webs. It is to be understood, however, that the crankshaft for a four cylinder engine comprises two more crankpins which are symmetrically shaped with respect to those illustrated. The crankshaft K is firmly held in stationary condition with no play by clamping means (not shown) fixed to the bed so that the crankshaft cannot rotate.

These clamping means engage the ends and a central portion of the crankshaft. The left-hand centre S is displaceably mounted in the axial direction in neck 22 so that the centre can be retracted to the left into the neck and thereby free the workpiece K. The two necks 22 and their centres S are co-axial with the horizontal axis 13 of the crankshaft K. Each of the two longitudinal slides 10 carries a tool unit including a cross-slide 18. For this purpose each slide 10 is provided on its upper face with a horizontal guideway 20 which extends transversely beneath the axis 13 of the workpiece and on which a broad foot 15 of a cross-slide 18 is guided. Each of the cross-slides 18 forms a housing enclosing a cylindrical space whose axis 50 has the same distance from the longitudinal slide 10 as the axis 13 of the workpiece. A composite eccentric body 19, 19' which carries an annular gear 150 fixed thereto, is rotatably supported in this cylindrical space by means of two thrust bearings 18'. The gear 150 drivably connects the eccentric body 19, 19' to a feed motor by means of gears; the feed motor and the gears will be described below. The feed motor causes the eccentric body 19, 19' to rotate on the ball bearings 18' about axis 50. The eccentric body 19, 19' can be immobilised at a given angular position, as is explained in detail in U.S. Pat. No. 3,795,161. The body 19, 19' encloses a cylindrical cavity and carries two internal ball-bearings 27. The common axis 94 of this internal cavity and of the ball-bearings 27 is spaced at a distance e from axis 50. The two bearings 27 support a tool 21 having internal cutting edges. The tool 21 has at one end an annular gear 70 fixed thereto which is adapted to be driven by an electric motor via intermediate gearing as will be described later. As the axis 13 of the crankshaft sections to be machined and the axis 50 of rotation of the eccentric body 19, 19' are spaced equal distances from the guideway 20, they coincide in FIG. 1. The drives provided for the two slides 10 and 18, and for the annular tool 21 are designed substantially as described in the U.S. Pat. No. 3,795,161. The drive for the cross-slide 18 comprises the elements 32, 34 and 40 in FIG. 2 and the drive for rotating the annular tool 21 comprises the elements 72–88 in FIG. 2. The drive for imparting rotation to the eccentric body 19 differs from that of the prior patent and will be described further down. Also explained in this prior patent is the positioning of the crankshaft K in the machine tool and the removal therefrom and this being so, a short resume of these two steps is deemed sufficient here.

When the eccentric body 19, 19' while rotating on the bearings 18' is brought to a stop at the moment when axis 94 of the tool is situated at the same level as the axis 13 of the workpiece and the axis 50, the cross-slide 18 can be moved to position in which the two axes 13 and 94 coincide as shown in FIG. 3 of the prior patent. When this movement has been effected, the cross-slide is stopped and the longitudinal slide 10 can be moved to the left in the drawing until the annular milling tool 21 encircles the neck 22. Once the other longitudinal slide 10 and the second tool unit have been displaced in the same way, the centres S can be retracted and the workpiece K can be removed transversely to its axis; the tool units do not obstruct this removal.

After a new workpiece has been placed in position in the machine tool and has been clamped, the two longitudinal slides 10 are moved to the machining position shown in the drawing, and the tools 21 begin to rotate. By feeding the cross-slides 18 in one or the other direction, a plunge cut can be made into the workpiece which is held stationary. The feed movement is arrested as soon as the axis 50 (FIG. 2) of the bearings 18' coincides with the work axis 13. Each eccentric body 19, 19' is then beginning to rotate on the ball bearings 18'. During the rotation, the annular milling tool 21 orbits about the line bearing surface of the crankshaft which is to be machined. Once each eccentric body 19, 19' has completed substantially one revolution in this way, a surface on crankshaft K will have been machined all around its circumference.

It will now be explained in what respects the present invention differs from the machine tool of the prior patent.

Whereas in the case of the machine tool of the prior patent, the annular milling tool has only a single circular set of milling teeth or blades in its inside, the tool according to the present invention is provided with at least two such circular sets of teeth or blades and with apertures for the removal or discharge of chips, said apertures being situated between the circular sets of blades, so that a plurality of co-axial surfaces of revolution can be machined simultaneously on the workpiece.

In the case of the present embodiment of a machine tool according to the invention, the annular tool is composed of a number of parts as will now be described with reference to the left-hand tool unit. The tool 21 includes a sleeve having an internal tapered face 100 and external faces 102 adapted to receive the inner races of the two ball-bearings 27. Mounted on the right-hand end-face of the sleeve is an annular supporting body in form of a bushing 106 secured by screws 104. A plurality of circular sets of internal cutting blades is arranged in the supporting body 106. These cutting blades serve to machine two spaced co-axial crankshaft sections forming bearing journals 108 and 110 as well as two end journals 112 and 114 on that crankshaft, the latter journals having step-wise reduced diameters.

The crankshaft K has five spaced co-axial sections constituting line bearings or line journals 108, 110, 130, 132 and 134. All of these line journals are machined simultaneously. The line bearing sections 110 and 112 are machined by the annular milling tool of the left-hand tool unit and the line bearing sections 130, 132 and 134 are machined at the same time by the annular milling tool of the right-hand tool unit.

As shown in FIG. 3 the inner circumferential surface of the bushing 106 is provided with four longitudinal grooves 113 extending parallel to the axis 94 of the bushing 106. Each circular set of cutting blades 115 is carried by an annular element in form of a circular disk 116 which on its outer circumference is provided with four longitudinal grooves registering with the grooves 113 and cooperating therewith in accommodating keys 118 which are fixed to the bushing 106 by screws 119. Each of the grooves and the keys therein have a rectangular cross-sectional profile and is so located as to afford radial heat expansion and contraction to the annular disk 116 with reference to the bushing 106. A clearance is provided between the outer periphery of the disk 116 carrying the blades 115 and the inner periphery of the bushing 106 and this clearance prevents any stresses from being set up in the bushing 106 by heat expansion of the blade-carrying disk 116.

Moreover, the disk 116 is provided with a set of perforations 121' permitting air to circulate therethrough for the purpose of cooling the tool. A second annular cutting element 122 provided with internal cutting blades is mounted within the bushing 106 for common rotation therewith in axially spaced relationship to the disk 116. This second annular cutting element 122 carries three adjacent internal annular sets of cutting blades 120 for machining the journals 118 and the two end journals 112 and 114 of the crankshaft. The annular cutting element 122 has likewise external grooves cooperating with the keys 118 and is capable of heat expansion owing to the provision of a clearance within the bushing 106. A spacer sleeve 123 is inserted inside of bushing 106 between the cutting element 122 and the cutting element 116. This sleeve 123 is provided with apertures registering with the apertures 124 of the bushing 106.

The head of each screw 104 is located within an aperture 124 as shown in FIG. 1. The bushing 106 is provided with longitudinal tapped bores for the accommodation of screws 105, FIG. 3, the heads of such screws overlapping the disk 116 to hold the same in contact with the spacer sleeve 123 and this spacer sleeve holds the cutting elements 122 in contact with the end wall of the carrier 21.

The three sets of cutting blades 120 are both axially and radially spaced from each other in conformity with the different diameters of the adjacent journals 108, 112 and 114.

If desired, the cutting element 122 may form three sets of internal fingers each finger carrying a hard metal insert provided with a cutting edge. This is shown in FIG. 1 just above the reference numeral 94.

The bushing 106 is surrounded at its outside by an annular casing 126 which is secured to the cross-slide 18 and which has at the bottom an opening 128 through which the cips can drop out.

The apertures 124 ensure that the chips cut by the cutting blades 115 and 120 which drop into the space between the cutting elements 116 and 122 will not clog the interior of the annular milling tool.

FIG. 1 shows that the annular set of cutting blades 120 engaging the pin or line bearing 108 is axially spaced from the set of blades 115 engaging pin 110 a distance which equals the total axial dimension of the crankpin K' therebetween and of the adjoining webs. Moreover, it will be appreciated that the internal diameter of the bushing 106 must be sufficiently large to enable the bushing to accommodate the voluminous crankshaft portion composed of the pins K' and of its adjoining webs.

An alternative design for the annular milling tool according to the invention is shown on the right-hand tool unit of the drawing. This annular tool 121 has an annular body in form of a bushing 106' which except for the location of its axis 94' corresponds to the bushing 106 carries on its inside three axially spaced annular cutting elements adapted to machine three co-axial shaft bearing journals 130, 132 and 134. The element for machining journal 134 has additionally inserted blades for machining an end flange 136 at its outside and two end journals 138 and 140 of the crankshaft K. Between the elements for machining journals 130, 132 and 134 the bushing 106' is provided with two sets of apertures 142 and 144 for the removal of chips.

Another difference between the machine tool according to the present invention and that of the prior art consists in that the eccentric body 19, 19' is composed of two pieces instead of one. It consists of an outer eccentric annular element 19 and an inner eccentric annular element 19' which latter is rotatably mounted in the outer eccentric element 19, with a rotary drive being provided for relative angular displacement of both elements resulting in an adjustment of the distance e. The radius of the machined surface of the workpiece corresponds to that of the circle on which the machining cutting edges are located less the distance e. If it is desired to change over from rough-cutting to finishing, that is to say to further reduce the radius of the machined surface of the workpiece, then it is necessary either to reduce the radius of the circle of cutting edges—which would create constructional problems—or to increase the distance e. This increase can be brought about by turning the two elements 19, 19' of the eccentric body relative to each other. The two elements will rotate together as a whole whilst machining is in progress, but will be turned relative to each other during the change-over from rough-cutting to finishing, and vice versa.

This relative angular displacement of the elements 19 and 19' is effected as follows.

An annular gear 150 is mounted on and rigidly connected with the outer eccentric element 19. A second annular gear 152 having external teeth 154 and internal teeth 156 is rotatably journalled on the outer eccentric element 19. The pitch circle of the external teeth 154 has the same diameter as the pitch circle of annular gear 150. The internal teeth 156 mesh with external teeth 52 provided on the inner eccentric annular element 19'. Driving means are provided for selectively either driving both gears 150 and 152 synchroneously or for driving gear 150 only while arresting gear 152 in stationary condition. In the latter alternative such driving means will angularly displace gear 150 and the outer eccentric annular element 19 fixed thereto relative to the inner eccentric annular element 19' which is held against rotation by the stationary gear 152. Therefore, during the rotation of the eccentric body 19, 19' and the consequent orbiting motion of the annular milling tool about the work, the distance e of the tool axis 94 from the axis 50 of the eccentric body 19, 19' may be either held stationary or may be changed.

A needle bearing 158 is interposed between the eccentric annular elements 19 and 19'.

The driving means for optionally driving either gear 150 only or both gears 150 and 152 synchroneously will now be described in detail. A horizontal axle 160 is mounted in the cross-slide 18 at a level above the ball-bearings 18' extending parallel to the axis 50. This shaft carries freely rotatable gears 162 and 164. Gear 162 meshes with the external teeth 164 of gear 152 and gear 164 meshes with gear 150. A drive shaft 166 is rotatably journalled in the cross-slide 18 at a level higher than that of axle 160 and extending parallel thereto. A gear 168 fixed to one end of shaft 166 meshes with gear 164 and with a pinion 170 fixed to a shaft of an electric motor 172. This motor is mounted on the cross-slide 18 and serves to impart rotation to the eccentric element 19 via the train of motion transmitting gears 170, 168, 164, 150.

A clutch sleeve 174 is journalled on the other end section of shaft 166 and is shiftable thereon to one or the other of two end positions. This sleeve, if in the right-hand end position with reference to FIG. 1, engages a clutch section 176 keyed to shaft 166. As a result, the clutch sleeve 174 will be driven simultaneously with gear 168. When shifted to the left-hand end position clutch sleeve 174 engages a brake disk 179 fixed to the cross-slide 118. As a result, the clutch sleeve 174 will be held stationary. The clutch sleeve 174 has a set of external gear teeth in mesh with the gear 162. Therefore, the elements 174, 162 and 152 constitute a second set of motion transmitting elements for transmitting motion from the drive shaft 166 to the inner eccentric annular element 19' driving the same in synchronism with element 19.

A first cam 180 is fixed to the drive shaft 166 to operate an electrical switch 177 and a second cam 182 is fixed to the clutch sleeve 174 to actuate an electrical switch 178. The switch 177 has the same function as switch 68 shown in the prior patent. Suitable electrical circuit means including switch 177 are capable of stopping motor 172 at the instant when the orbiting axis 94 of the milling tool will have reached the same distance from the horizontal guideway 20 as have the coinciding axes 50 and 13 of the eccenter body 19, 19' and the work. The electrical circuit means includes a counter operated by switch 177. Similarly, cam 181 controls a switch 178 which forms part of an electrical control means including a second counter and determining the period of time during which the train of motion transmitting elements 174, 162 and 152 is kept stationary and arrests the inner eccentric element 19' while the outer eccentric element 19 rotates. As a result, the switch 178 serves to control the angular displacement that will be effected between the eccentric annular elements 19 and 19' while clutch sleeve 174 is in its left-hand position. The means for this selective displacement of the clutch sleeve 174 are not shown. They are well-known in the art.

A further difference between the novel machine tool and that of the prior art consists in that one of the orbiting tools including bushing 106 rotates about its axis 94 in a direction opposite to that in which the other orbiting tool and its bushing 106' revolve about its axis 94'. In practice, the two tool units of the prior machine described in U.S. Pat. No. 3,795,161 were operated in the same manner in that the plunge cut was effected by movement of the cross-slide 18 from the left towards the right with reference to FIG. 2. Moreover, both annular tools 21 were driven by shafts 74 to rotate about their axes 94 in the same direction. Therefore, the cutting forces exerted on the crankshaft by one tool unit tend to turn the crankshaft about its axis 13 in the same sense as the cutting forces exerted on the crankshaft by the other unit. The torque thus exerted on the crankshaft by the joint effect of the tool units could be easily handled in the prior machine by the clamping means holding the crankshaft stationary because the prior machine was equipped with two annular sets of cutting edges only. In the novel machine here described, however, where each tool unit has more than one annular set of cutting edges, it is desirable to reduce such torque. Moreover, it is desirable to reduce the bending effect exerted by the cutting forces upon the crankshaft. These beneficial effects can be attained according to this invention by rotation of the annular tools 21 of the two tool units in opposite directions. This means, that the shaft 74 in one tool unit must be driven in clockwise direction, while the shaft 74 in the other tool unit is driven in anti-clockwise direction.

Another possibility of minimizing the adverse effect of the cutting forces on the crankshaft is such an operation of the machine described hereinabove that the annular tools of one tool unit engage the crankshaft cuttingly in a different radial plane of the co-axial crankshaft bearings than the annular tools of the other tool unit. Such planes are angularly offset from each other by a large angle of up to 180°. In this mode of operating the machine the motors 32, when feeding the cross-slides 18 starting from the initial position illustrated in FIG. 3 of prior U.S. Pat. No. 3,795,161 in which axis 13 of the workpiece coincides with axis 94 of the annular tools after the crankshaft has been inserted in the machine, rotate in opposite directions so as to feed one cross-slide 18 to the right towards the FIG. 2 position and the other cross-slide 18 to the left until the annular tool of this other cross-slide will plunge into the workpiece W from the opposite side thereof. Under normal conditions the plunging cuts will take about the same time and, therefore, the drive of the eccentric bodies in both units will start about the same time. This means, that the orbiting motions performed by the two annular tools will start from angular positions located on opposite sides of the workpiece W. It may happen, that the plunging operation in one tool unit takes less time than that in the other tool unit and that, therefore, one of the annular tools will start its orbiting motion a little earlier than the other annular tool. In this event, the radial planes of the crankshaft in which the annular tools engage the same cuttingly will be offset from each other somewhat less than 180°. Nevertheless the cutting forces exerted upon the crankshaft in one tool unit will have a direction substantially opposite to that of the cutting forces in the other tool unit even if both annular tools rotate about their axes 94 in the same direction.

As the crankshaft is clamped in stationary condition by three clamps, one at each end and the third one in the middle of the crankshaft, it is not only desirable that the torques exerted by the two tool units on the crankshaft about the longitudinal axis thereof oppose each other; it is also desirable, that the bending moment exerted on the crankshaft by the cutting forces in one tool unit with respect to the central clamp oppose the bending moment exerted upon the crankshaft in the other tool unit. These requirements are both met by a mode of operation in which the annular tool of one unit rotates in a direction opposite to that of the annular tool of the other unit and in which the annular tool in one unit engages the work on a side opposite to that where the annular tool of the other unit engages the work.

The annular tools may consist of grinding material. An annular grinding disk with a grinding face on its inside constitutes an annular tool with internal cutting edges since the granules of grinding material form the cutting edges on the inside of the annular tool.

The method of roughing and finishing the work by means of the machine illustrated in FIGS. 1 and 2 is briefly the following. When the bed slides 10 are in such an inoperative position on the frame or bed provided with the cylindrical necks 22 that the annular supporting bodies 106 and 106' surround these necks, the crankshaft to be machined is inserted and firmly clamped in stationary non-rotating position on the frame between the centers S. For this purpose suitable clamps engage the ends of the crankshaft and a central crankpin K3. Thereupon the longitudinal slides 10 are moved to their operative positions such as shown in FIG. 1 in which the cutting blades carried by the annular supporting bodies 106 and 106' are slipped over the crankshaft from the ends thereof into positions in which the circular sets of blades register with the co-axial crankshaft sections to be machined. When the bed slides are in their inoperative positions and while they are moving therefrom to their operative positions, each cross-slide 18 and the eccentric body 19, 19' thereon are so adjusted as to cause the axis 94, or 94' respectively, to coincide with the axis 13 of the crankshaft. Therefore, each annular set of cutting blades surrounds the crankshaft section in registry therewith in co-axial relationship. As a result, the cranks of the crankshaft will not interfere the cutting blades during the travel of the bed slides 10 to inoperative or operative position, as shown in FIG. 3 of the prior patent.

After the bed slides have been stopped in their operative positions, rotation will be imparted to the annular tools by starting the motor driving shaft 74 in FIG. 2 while motor 172 and the eccentric body 19, 19' driven thereby does not yet rotate. It may be mentioned here that while FIG. 2 indicates an endless chain by the dash-dotted line 78, a set of gears has been substituted for the chain 78 in the embodiment shown in FIG. 1. After rotation has been imparted to the annular tool element 21, the motors 32 in both tool units are started in opposite directions to impart feed motion to each cross-slide 18 and to the eccentric body 19 travelling in unison therewith from the position in which the axes 94 and 94' coincide with axis 13 to the position shown in which the axis 50 coincides with the tool axis 94 or 94' respectively. During these feed motions the internal cutting blades of the tool elements 21 and 121 will take plunge cuts into the coordinated crankshaft section from opposite sides thereof cutting therefrom crescent-shaped recesses at opposite sides. The control means 44 and 48 shown in FIG. 2 will stop this plunge feed of each cross-slide 18. When the cross-slides 18 have been stopped, the motor 172 in each tool unit will be started with the clutch sleeve 174 in its right-hand position to impart rotation to the eccenter body 19, 19' which, in its turn, will impart an orbiting motion to the tool 21 or 121 in which the axis 94 or 94' thereof will travel around the axis 13 on a circular path. Both motors 172 rotate in the same direction. As a result, the cutting blades of the tool units 21 and 121 will take circumferential cuts from the work W in which the crescent-shaped recess will progress circumferentially around the work W until, after an orbiting travel of 360° of the tool, the entire circumference of the work W will have been roughed. During this orbiting motion the tools 21 and 121 engage the work from opposite sides as shown in FIG. 1. As the next step of the method the distance e between the axes 94, 94' and 13 in each tool unit will be increased by an amount corresponding to the depth of a finishing cut. This is effected by a temporary shifting of clutch sleeve 174 into engagement with the brake disk 179. The orbiting motion of the tool axis 94 or 94' about the work W is continued after the tool axis has travelled at least once around the axis 13 while the clutch sleeve 174 engages the brake disk 179. As soon as the proper length of the distance e has been reached, the electrical control means including the switches 177 and 179 will respond thereto and cause the clutch sleeve 174 to be moved back into engagement with clutch section 176 again. As a result, the orbiting motion of the tool is continued through at least 360° whereby the circumferential finishing cut is taken from the work. Then, the motor 172 is stopped, the cross-slide 18 is returned to its starting position and the eccentric body 19 will be turned by motor 172 to the position in which the tool axis 94, or 94' respectively, is on the same level with axis 50. The bed slides 10 are then moved to their inoperative positions in which the crankshaft may be released and discharged from the machine.

While the machine shown in FIG. 1 is so designed as to simultaneously machine the five line bearing sections of the crankshaft, it may be likewise used for the simultaneous cutting operation on a set of co-axial crankpins, provided that the crankshaft is so clamped in position as to hold the crankpins on the same level as the axis 13 of the line bearing sections.

The embodiments of the present invention described hereinabove are capable of numerous other modifications within the scope of the appended claims.

I claim:

1. A machine tool for simultaneously machining a pair of crankshaft sections comprising a frame, means on said frame for holding said crankshaft in stationary condition, a pair of parallel guideways extending transversely to said crankshaft at equal distances therefrom, and a pair of tool units one movably mounted on each of said guideways, each tool unit comprising
  (a) a cross-slide on each of said guideways;
  (b) an eccentric body journalled in said cross-slide for rotation about a first axis;
  (c) an annular tool having internal cutting edges, said tool being journalled in said eccentric body for rotation about a second axis and surrounding said crankshaft;
  (d) first driving means for imparting rotation to said annular tool determining the cutting speed of said edges;
  (e) second driving means for imparting a plunging feed motion to said cross-slide on said guideway to a position in which said first axis coincides with the axis of the crankshaft section being machined;
  (f) third driving means for imparting a revolution to said eccentric body causing said annular rotary tool to orbit around said crankshaft section;
  (g) adjustable controlling means responsive to said feed motion and operative, when the feed motion has caused said annular tool to plunge into said crankshaft held in stationary condition to an adjustable depth to stop said cross-slide and to start said third driving means of both tool units to impart revolution to said eccentric bodies of said tool units in the same direction and with the same velocity;
  the second driving means of one tool unit and said second driving means of the other tool unit being operative to impart the feed motion to the respective cross-slides of said units in opposite directions thus causing said annular tools of said tool units to plunge into opposite sides of said crankshaft and to start on opposite sides of said crankshaft to orbit therearound.

2. A method of operating a machine tool for simultaneously machining a pair of crankshaft sections of the type comprising a frame, means on said frame for holding said crankshaft in stationary condition, a pair of parallel guideways extending transversely to said crankshaft at equal distances therefrom, and a pair of tool units one movably mounted on each of said guideways, each tool unit comprising
  (a) a cross-slide on each of said guideways;
  (b) an eccentric body journalled in said cross-slide for rotation about a first axis;
  (c) an annular tool having internal cutting edges, said tool being journalled in said eccentric body for rotation about a second axis and surrounding said crankshaft;

(d) first driving means for imparting rotation to said annular tool determining the cutting speed of said edges;

(e) second driving means for imparting a plunging feed motion to said cross-slide on said guideway to a position in which said first axis coincides with the axis of the crankshaft section being machined and (f) third driving means for imparting a revolution to said eccentric body causing said annular tool to orbit around said crankshaft section, said method comprising operating said second driving means in both of said tool units in opposite directions to effect the plunging cut in opposite radial planes of the crankshaft sections machined by said tool units and commencing operation of said third driving means in both of said tool units in the same direction and with the same velocity upon completion of said plunging cut, whereby said annular tools will cuttingly engage opposite sides of said crankshaft sections during their orbiting motions.

3. A method claimed in claim 2 in which said first driving means of one of said tool units acts in the same direction as said first driving means of the other tool unit.

4. The method claimed in claim 2 in which said first driving means of both of said tool units act in opposite directions.

5. A method of operating a machine tool for simultaneously machining two groups of co-axial sections of a crankshaft, said machine having means for holding said crankshaft stationary, and two tool units, each unit being provided with a bushing having internal axially spaced annular sets of cutting teeth and surrounding one of said groups, said method comprising the following consecutive steps:

(a) inserting said crankshaft into said bushings while holding the same in coaxial relationship thereto and imparting rotation to said bushings about their axes;

(b) holding said crankshaft stationary and moving said bushings transversely to the crankshaft in opposite directions until said sets of cutting teeth plunge into said groups of crankshaft sections from opposite sides of said crankshaft;

(c) stopping said transverse movement of both of said bushings when said plunging movement has reached a desired depth;

(d) imparting orbiting motions to said rotating bushings about said crankshaft in the same direction, said orbiting motions causing the axes of said bushings to travel around the axis of said crankshaft in parallel relationship thereto while holding the cutting teeth of the bushing of one of said tool units in cutting engagement with the peripheries of the crankshaft sections of one of said groups and while holding the cutting teeth of the bushing of the other tool unit in cutting engagement with the peripheries of the other group of sections on the opposite side of said crankshaft;

(e) increasing the distances of the bushing axes from the crankshaft axis upon completion of one orbiting cycle and (f) repeating step d to thereby take a finishing cut from said crankshaft sections.

6. A method as claimed in claim 5 in which said bushings are rotated about their axes in opposite directions.

* * * * *